United States Patent
Hally et al.

(10) Patent No.: US 8,063,176 B2
(45) Date of Patent: Nov. 22, 2011

(54) METHOD AND DEVICE FOR THE CRYSTALLIZATION OF POLYESTER MATERIAL

(75) Inventors: Nazim S. Hally, Frankfurt am Main (DE); Stefan Deiβ, Horxheim (DE); Brigitte Otto, Milow (DE)

(73) Assignee: Lurgi Zimmer GmbH, Frankfurt (DE)

( * ) Notice: Subject to any disclaimer, the term of this patent is extended or adjusted under 35 U.S.C. 154(b) by 476 days.

(21) Appl. No.: 11/687,180

(22) Filed: Mar. 16, 2007

(65) Prior Publication Data

US 2007/0219341 A1   Sep. 20, 2007

(30) Foreign Application Priority Data

Mar. 16, 2006  (DE) .......................... 10 2006 012 587

(51) Int. Cl.
*C08F 6/00* (2006.01)
(52) U.S. Cl. ................ 528/502 R; 528/272; 528/308.2; 528/503; 525/437; 422/245.1; 422/139; 422/141; 422/608
(58) Field of Classification Search ................ 528/272, 528/308, 308.1, 308.2, 308.3, 480, 502 R, 528/503; 264/255, 512, 513, 523, 537, 328.8, 264/519, 520, 521, 535, 265, 259, 54, 141, 264/328.16, 904, 908; 525/437; 422/129, 422/131, 139, 141, 245.1, 408
See application file for complete search history.

(56) References Cited

U.S. PATENT DOCUMENTS

| | | |
|---|---|---|
| 2,974,126 A | 3/1961 | Kelley |
| 3,117,950 A | 1/1964 | Kibler et al. |
| 3,492,283 A | 1/1970 | Miller |
| 4,064,112 A | 12/1977 | Rothe et al. |
| 4,161,578 A * | 7/1979 | Herron ........................ 528/308.5 |
| 4,198,161 A | 4/1980 | Larson |
| 4,205,157 A | 5/1980 | Duh |
| 4,223,128 A | 9/1980 | Halek et al. |
| 4,230,819 A | 10/1980 | Hauenstein et al. |
| 4,238,593 A | 12/1980 | Duh |
| 4,327,759 A | 5/1982 | Millis |
| 4,370,302 A | 1/1983 | Suzuoka et al. |
| 4,436,782 A | 3/1984 | Ho |
| 4,584,366 A | 4/1986 | Gerking et al. |
| 4,710,113 A | 12/1987 | Voigt |
| 4,728,276 A | 3/1988 | Pauley et al. |

(Continued)

FOREIGN PATENT DOCUMENTS

DE   4131362   3/1993

(Continued)

OTHER PUBLICATIONS

Aldrich Katalog, from "Staerkepfr" to "Stearylalk" (1996) p. 1484-1485.

(Continued)

*Primary Examiner* — James J Seidleck
*Assistant Examiner* — Frances Tischler
(74) *Attorney, Agent, or Firm* — Michael Best & Friedrich LLP (57) ABSTRACT

A method for the manufacture of crystallized polyesters with or without subsequent solid state polycondensation for the manufacture of bottles, foils, films and technical high-performance fibres, or with or without subsequent dealdehydization for the manufacture of bottles, foils, films and technical high-performance fibres.

13 Claims, 1 Drawing Sheet

U.S. PATENT DOCUMENTS

| | | | |
|---|---|---|---|
| 5,090,134 A | 2/1992 | Russemeyer et al. | |
| 5,098,667 A | 3/1992 | Young et al. | |
| 5,292,865 A | 3/1994 | Kerpes et al. | |
| 5,362,844 A | 11/1994 | Kerpes et al. | |
| 5,536,810 A | 7/1996 | Thiele | |
| 5,558,678 A | 9/1996 | Weger | |
| 5,573,820 A | 11/1996 | Harazoe et al. | |
| 5,663,290 A | 9/1997 | Heise et al. | |
| 5,714,571 A | 2/1998 | Al Ghatta et al. | |
| 5,864,005 A | 1/1999 | Kim et al. | |
| 5,968,429 A | 10/1999 | Treece et al. | |
| 6,066,713 A * | 5/2000 | Mrose et al. | 528/272 |
| 6,559,271 B2 | 5/2003 | Schaaf et al. | |
| 7,208,107 B2 | 4/2007 | Jurgens et al. | |
| 2002/0032300 A1 | 3/2002 | Dowling et al. | |
| 2002/0094402 A1 | 7/2002 | Jen | |
| 2002/0128427 A1 | 9/2002 | Schaaf et al. | |
| 2003/0139543 A1 | 7/2003 | Wilhelm et al. | |
| 2005/0080225 A1 | 4/2005 | Otto et al. | |
| 2006/0165564 A1 | 7/2006 | Cavaglia | |
| 2006/0189783 A1 | 8/2006 | Deiss et al. | |
| 2007/0179269 A1* | 8/2007 | Otto et al. | 528/272 |

FOREIGN PATENT DOCUMENTS

| | | |
|---|---|---|
| DE | 4223197 | 1/1994 |
| DE | 4314162 | 4/1994 |
| DE | 4309227 | 9/1994 |
| DE | 19505680 | 5/1996 |
| DE | 19503053 | 8/1996 |
| DE | 19519898 | 12/1996 |
| DE | 19914116 | 9/2000 |
| DE | 10043277 | 3/2002 |
| DE | 10158793 | 6/2003 |
| DE | 10349016 | 6/2005 |
| EA | 007520 | 10/2006 |
| EP | 0222714 | 5/1987 |
| EP | 0379684 | 8/1990 |
| EP | 0432427 | 6/1991 |
| EP | 0597155 | 5/1994 |
| EP | 0712703 | 5/1996 |
| EP | 0842210 | 5/1998 |
| EP | 0939095 | 9/1999 |
| EP | 1273610 | 1/2003 |
| JP | 60120839 | 6/1985 |
| JP | 06247899 | 6/1994 |
| JP | 09249744 | 9/1997 |
| JP | 10182802 | 7/1998 |
| JP | 11315137 | 11/1999 |
| RU | 2201943 | 4/2003 |
| WO | WO 94/15991 | 7/1994 |
| WO | WO 94/17122 | 8/1994 |
| WO | WO 95/10557 | 4/1995 |
| WO | 98/18847 | 5/1998 |
| WO | WO 01/05566 | 1/2001 |
| WO | WO 01/81450 | 11/2001 |
| WO | WO 02/068498 | 9/2002 |
| WO | 03/011940 | 2/2003 |
| WO | WO 03/033581 | 4/2003 |
| WO | WO 03/046045 | 6/2003 |
| WO | WO 03/085026 | 10/2003 |
| WO | 2004058852 | 7/2004 |
| WO | WO 2004/055093 | 7/2004 |
| WO | WO 2004/065909 | 8/2004 |
| WO | WO 2005/044901 | 5/2005 |
| WO | WO 2005/085318 | 9/2005 |
| WO | WO 2005/092949 | 10/2005 |

OTHER PUBLICATIONS

Whitehead, B.D., "The crystallization and drying of polyethylene terphthalate (PET)," Ind. Eng. Chem. Process Des. Dev. (1977) 16(3):341-346.

International Search Report for Application No. PCT/EP2005/002003 dated Jun. 9, 2005, 6 pages.

United States Patent Office Action for U.S. Appl. No. 10/497,279 dated May 9, 2006 (5 pages).

United States Patent Office Action for U.S. Appl. No. 10/497,279 dated Oct. 16, 2006 (9 pages).

United States Patent Office Action for U.S. Appl. No. 10/543,180 dated Aug. 4, 2008 (7 pages).

United States Patent Office Action for U.S. Appl. No. 10/543,180 dated Dec. 4, 2008 (7 pages).

United States Patent Office Action for U.S. Appl. No. 10/591,567 dated Feb. 17, 2009 (13 pages).

United States Patent Office Action for U.S. Appl. No. 10/591,567 dated Sep. 1, 2009 (11 pages).

* cited by examiner

Fig. 1

METHOD AND DEVICE FOR THE CRYSTALLIZATION OF POLYESTER MATERIAL

CROSS-REFERENCE TO RELATED APPLICATIONS

This patent application claims foreign priority to German Patent Application No. 102006012587.8, filed 16 Mar. 2006, the disclosure of which is incorporated by reference herein in its entirety.

BACKGROUND

The well-known aromatic polyesters or copolyesters, in particular polyethylene terephthalate and the copolymers thereof with low proportions of, for example, isophtalic acid or cyclohexanedimethanol, polybutylene terephtalate, polytrimethylene terephtalate, polyethylene naphthalate and the copolyesters thereof, serving as starting materials for fibres, films, foils and packaging, are processed into granules of medium viscosity after a melt polycondensation. The mean degree of polycondensation, expressed as the intrinsic viscosity (I.V.) is in the range between 0.30-0.90 dl/g in case of polyethylene terephthalate and its correspondingly low-modified copolyesters after the melt polycondensation.

The expressions "granules" and "chip" will have the same meaning in the following and will therefore be used as synonyms.

As the manufacture of granules having an I.V. above 0.65 dl/g, in particular in conventional autoclaves, is hardly possible and high viscosities of >0.80 dl/g require special reactors, and moreover the polyesters for food packaging require a very low acetaldehyde content, according to prior art the melt polycondensation was in the past followed by a solid state polycondensation (SSP) leading to an increase in I.V. in general by 0.05-0.4 dl/g and to a reduction of the acetaldehyde content of about 25-100 ppm to values of <1 ppm in the PET (polyethylene terephthalate).

In this solid state polycondensation following the melt polycondensation stage, the medium viscosity is thus increased such that the strengths required for the corresponding field of application are achieved, the acetaldehyde content in food packaging is reduced corresponding to the requirements and the exiting oligomer portion is reduced to a minimum. Here, it is important that moreover the acetaldehyde, which is bound as vinyl ester and also referred to as depot acetaldehyde, is decomposed to such a degree that during processing of the polyester granules into packaging, in particular into polyester bottles according to the stretch blow moulding and injection stretch blow moulding methods, only a minimum amount of acetaldehyde is re-formed in the polyester. Especially if mineral water is filled into polyester bottles, less than 2 ppm of acetaldehyde, preferably even less than 1 ppm of acetaldehyde, should be contained in the bottle wall of polyethylene terephthalate.

Apart from SSP, methods are known for the dealdehydization of polyethylene terephthalate by treatment with nitrogen or dry air, as described in the U.S. Pat. No. 4,230,819. To obtain the required low acetaldehyde content in the material, temperatures of up to about 230° C. are used, while at low temperatures between 170 and 200° C. unsatisfactorily high acetaldehyde contents remain in the granules. When air is used, a strong thermooxidative decomposition of the polyester has to be expected at such high temperatures. When nitrogen is employed, the costs for gas and complicated purification are increased.

In U.S. Pat. No. 4,223,128, temperatures above 220° C. are excluded when air is employed as the carrier gas. The desired increase in I.V. by means of large amounts of dry air with a dew point of −40 to −80° C. is described. At the treatment temperature of 200° C. given in the examples of this patent, in continuous methods comprising a more or less wide range of residence times, oxidative damage of individual grains of the granules cannot be excluded.

In SSP, a chain extension of the polyesters in the solid state for keeping the side reactions, occurring to a stronger degree in a melt, as small as possible, and a removal of the harmful by-products are achieved. With this chain extension expressed in an increase in I.V., products, such as bottles or wire cord requiring an increased strength, can be produced. However, since polyesters are partly crystalline thermoplastic materials, they comprise, depending on their type, a more or less high amorphous proportion. This fact poses difficulties in the execution of SSP as the amorphous proportions at the temperatures necessary for SSP lead to agglomerations which can lead to a standstill of the production plant.

Therefore, it is moreover known to carry out, as a pre-stage to SSP, a crystallization of the partly crystalline chips from the melt polycondensation for preventing tendency to agglomeration under nitrogen or air atmosphere at temperatures between 160-210° C., as described in the U.S. Pat. Nos. 4,064,112, 4,161,578 and 4,370,302.

WO 94/17122 discloses a 2-stage crystallization with pre-heating and intermediate cooling before SSP to prevent agglomeration. The described SSP temperature is in the range between 205 and 230° C.

To improve the quality of the chips one can, as described in JP 09249744 or U.S. Pat No. 5,663,290, work with moist inert gas before or during SSP, or, as disclosed in U.S. Pat. No. 5,573,820, the chips can be treated beforehand with hot water or directly intensively with water vapour at temperatures up to 200° C. before crystallization. In this case, however, already at the common temperatures of >190° C., one has to expect a strong undesired decrease in I.V. due to the hydrolysis in the PET.

A further method is the treatment of the chips to be crystallized with purified non-dried nitrogen from SSP in countercurrent flow in a second crystallization stage, as illustrated in EP 222 714. The effect for reducing the acetaldehyde content described therein is rather considered as being low.

Processors of these granules are mainly manufacturers of hollow bodies. In preforming machines working according to the injection moulding method preforms are often manufactured from which in turn polyester bottles are produced in a blow moulding method in a further step. Other forming methods for polyester granules, for example in machines for film and foil manufacture, are also possible.

Methods for the manufacture of a polyester with the desired viscosity avoiding SSP have also been developed in the meantime. Thus, a method is for example described in DE 195 03 053 in which the melt exiting from the polycondensation reactor is mixed with an inert gas and an AA-reduced not easily volatilized amide compound in a line provided with static mixing elements, and the melt is fed to a forming device for the manufacture of preforms under vacuum degassing within the shortest-possible time and with as little shearing as possible.

In DE 195 05 680, an inert gas is added to the polycondensation melt having an I.V.=0.5-0.75 dl/g, the melt is polycondensed in an aftercondensation reactor under vacuum until a viscosity of 0.75-0.95 dl/g is reached, and the melt is afterwards immediately supplied to a mould.

EP 0 842 210 states another possibility of avoiding SSP. There, the melt polycondensation is performed until a viscosity of 0.65-0.85 dl/g is reached, the polyester is cooled and granulated, fused again and then freed from volatile substances, such as AA, in a suited device by rinsing with a suited cleansing agent.

If the polyester melt is not directly taken from a forming unit, it is generally granulated to obtain an intermediate product that can be stored and transported.

For the granulation of plastics, for example the pelletization method has been introduced to the market. This method is characterized by pressing relatively long plastic strands through a breaker plate in continuous operation and subsequently passing them in a freely hanging state through a water bath after a short distance of transport through air. Due to the small surface of a plastic strand compared to the granules, water absorption can here be largely restricted. The cooled strands are dried and fed to a granulator. In this method, the granulation is performed in a solid state and cylindrical chips are obtained. Subsequently, normally another drying takes place, for example described in DE 43 14 162 or in the plastics handbook. When this granulation method is used, the possibility of a strong temperature increase at points in the strand and thus of increased decomposition phenomena in the polymer and irregular degrees of crystallization varying from chip to chip are very high. With this technology, cooling in the chip takes place from the outside to the inside.

Another possibility of granulating polymer melt after polycondensation is today above all underwater granulation where the melt is directly separated with cutting knives after it exits from the nozzles/breaker plates of the granulator in a subsequent water chamber. The separated granules are still plastic and are deformed by surface tension when they are quenched in cold water, where the cooling also takes place from the outside to the inside, and they take an approximately round to lenticular contour. The cooled granules are separated from the water flow in a water separator, for example a centrifuge, and dried and then packed into big bags or conveyed into silos for their further processing (DE 35 41 500, DE 199 14 116, EP 0 432 427, DE 37 02 841). The chips manufactured in this manner comprise a uniform degree of crystallization of less than 10%.

In U.S. Pat. No. 4,436,782, a method of granulation and further treatment of PET to chips is in turn described in which at temperatures between 260° C. and 280° C. an oligomer mixture of an I.V. of 0.08-0.15 dl/g is pressed through nozzles, so that drops are formed which fall through a cooling zone with inert gas atmosphere into a water bath or onto a belt conveyor, and the drops solidify to form amorphous chips. In this method, too, chips having a high proportion of amorphous structures are formed.

In all described methods, granules with a low degree of crystallization, usually below 12%, are obtained. It is well-known that expensive reaction steps are necessary to increase the crystallinity of the polymeric granules for example as pre-stage to SSP. High operation costs arise among others due to the fact that the granules arriving at ambient temperature first have to be heated to crystallization temperature.

In WO 01/81450, describe a method and device for dropping pre-products of thermoplastic polyesters and copolyesters which overcome the disadvantage of the above-described granulation methods concerning crystallinity, describe the shortening of the process of conventional granulation methods and are based on presently known procedure steps and devices to manufacture surface-crystallized dropped pre-products in the form of monomers, oligomers, monomer-glycol mixtures or partly polycondensed materials. To this end, the product is introduced into a gaseous medium wherein the gaseous medium accelerates the crystallization process of the pre-product and induces the crystallization state in an accelerated manner after the dropped pre-product has entered the gaseous medium by keeping the dropped pre-product at a temperature of >100° C. and below its melting point for a limited period until sufficient crystallization in the surface of the drop is terminated. That means, here too, the outer layer is crystallized to a greater extent. Thus, a non-sticking surface promising direct further treatment to form high-polymeric condensation polymer is obtained. A material produced in such a way only withstands the required mechanical loads to a certain level. Brittleness is increased compared to an amorphous chip. Another disadvantage of this crystallinity generation in the low-molecular range is that the chip is, after SSP is terminated, perfectly crystallized through with rigidly oriented crystal structures for the destruction of which incomparably higher energy is required during the melting operation when, for example, preforms are manufactured with injection moulding. Due to the required high melting temperature of at least about 300° C., acetaldehyde reformation in the preforms strongly increases and quality is deteriorated, which is mainly also due to increased decomposition reactions. Moreover, there is a risk that the course of SSP is hindered or even stopped due to the immobility of the chain ends when viscosity increases.

A further granulation method for the manufacture of crystallized chips during the granulation process is described in WO 01/05566. Melted plastic strands exiting from nozzles are directly partly crystallized in a temperature-controlled liquid medium on a crystallization line, where in this liquid medium temperatures are kept above the glass transition temperature of the plastic strands. The granulation device is downstream of the crystallization line. By the crystallization in the shell of the plastic, sufficient strength is present to subsequently divide the plastic strands into chips after a short temperature-controlled line in the granulation system without previous drying. That means, here too, the outer layer is crystallized to a greater extent. A disadvantage is that after granulation of the plastics, there is a mixture of granulate and liquid medium, and thus drying of the granules with known means has to be effected.

The German patent application DE 103 49 016 A1 as well as WO 2005/044901 A1 describe that directly after an underwater granulation, the just manufactured chips are very quickly freed from water and dried and crystallized utilizing their sensible heat. In the process, nearly spherical chips are obtained. To avoid agglomeration of the chips, these are conveyed to a downstream filling plant or a further processing plant directly after the water has been removed by centrifugation and after sufficient residence time via a vibroconveyor or oscillating conveyor. With this technology, the crystallization process takes place from the inside to the outside of the chip with utilization of their sensible heat, whereby a more uniform crystallization across the diameter of each chip is achieved. Commercial plants produce about 600 tons of polyester granules per day. To crystallize them according to the method described in DE 103 49 016 A1 or WO 2005/044901 A1, for mechanical reasons several parallel vibroconveyors or oscillating conveyors are necessary, causing considerable investment and operation costs.

The chips manufactured by means of this method can be further treated in a conventional plant for solid state dealdehydization according to DE 102004015515 A1 to reduce the acetaldehyde content to a desired value. The chips still having a heat of 140° C. after crystallization have to be heated to a temperature of more than 210° C. for solid state dealdehydization. In this manner, the acetaldehyde content in the chip can be reduced, for example, from 43 ppm to 0.9 ppm.

DE 10158793 A1 describes a two-stage crystallization method in which in the first stage, a so-called fluid-bed crystallizer, partly crystalline polyester material having a degree of crystallization of about 40 to about 48% is provided, and in a second stage, a so-called shaft-type crystallizer, the partly crystalline polyester material flows at temperatures appropriate for crystallization in a zone (i) under mechanical disturbance and in countercurrent flow, in a following zone (ii) under mechanical disturbance and gas in co-current flow, and in a third zone (iii) without mechanical disturbance and gas in co-current flow. After the second stage, the polyester material has a degree of crystallization of about 49 to about 53%. The preferred total residence time in both stages is 130 to 330 min. While in the shaft-type crystallizer practically no dust is formed due to its design, in the fluid-bed crystallizer a lot of dust is formed due to the intensive movement of the chips against one another, which dust is removed from the fluid bed by the turbulence gas flow and has to be separated in the waste gas purification system. The turbulent gas flow guidance moreover requires complicated and energy-intensive means, such as for example blowers, tubes and heat exchangers.

The aim of these crystallization steps is to reduce the amorphous proportion of the polyester to such an extent that SSP or dealdehydization can be performed without agglomerations.

The basic differences between the execution of SSP or dealdehydization and crystallization are:
1. The residence times in crystallization are considerably shorter than in SSP (on average 2-180 min compared to 5-40 h).
2. In crystallization, the physical processes prevail compared to chemical reactions, for example, in crystallization, the I.V. only slightly increases (by 0.01 to 0.02 dl/g), while in SSP, the increase of I.V. is normally 0.2 to 0.3 dl/g.

That is, the disadvantages of the known crystallization methods are in particular the cost- and energy-intensive devices as well as the high amount of dust.

DETAILED DESCRIPTION

The invention relates to a method and a device for the crystallization of polyester granules preferably used for manufacturing moulded polyester products.

It is an object of the invention to provide a method for the manufacture of polyesters in the solid state that can be easily performed and by which simultaneously the particularly high quality demands on polyester for packaging with respect to colour, molecular-weight distribution, acetaldehyde content, acetaldehyde reformation, oligomer proportion and agglomeration tendency are maintained or improved, and simultaneously a significant reduction of waste and dust formation are achieved.

According to the invention, this object is achieved by a method for the manufacture of polyesters, comprising a single-stage crystallization of a polyester material, wherein partly crystalline polyester material having a degree of crystallization of <15% and a granules temperature above crystallization temperature is provided, and the polyester material flows through the crystallization stage at temperatures appropriate for crystallization under little mechanical disturbance without flow of gas, or
(i) under mechanical disturbance and, if required, with gas in countercurrent flow,
(ii) under mechanical disturbance and, if required, with gas in co-current flow, and
(iii) without mechanical disturbance and, if required, with gas in co-current flow.

"Flowing" of the polyester material in the sense of the present invention means a movement of the polyester material into one direction, wherein the movement can be effected, for example, by gravitation and/or mechanical conveying.

The adjustment of the appropriate granules temperature when they enter the crystallizer is essential for the invention. It has to be higher than the crystallization temperature $T_k$ known to the person skilled in the art for the respective polymer. A method for determining the $T_k$ is described in the examples. $T_k$ i , for example, for polyethylene terephthalate with 2 weight percent of IPA and 1.3 weight percent of DEG about 140 to 170° C.

To maintain the necessary treatment temperature of the respective polyester, there are several possibilities of adjusting the temperature:
a) The granules temperature at the inlet into the crystallization is controlled such that the necessary temperature is reached in the apparatus, i.e. the introduced latent energy with the chips and the heat tonality of the crystallization are in thermal equilibrium with the heat losses and the product temperature being reached.
b) The introduced latent thermal energy of the granules, together with the heat tonality of the crystallization, result in a temperature that differs from the necessary crystallization temperature. In these cases, the necessary crystallization temperature can be purposefully adjusted by means of the flow of gas.
   With a granules temperature below the necessary crystallization temperature by heating
   With a granules temperature above the necessary crystallization temperature by cooling.

The present method is suited for the manufacture of granules of partly crystalline aromatic polyesters or copolyesters, available from one or several dicarboxylic acids or the methyl esters thereof, such as terephtalic acid, isophthalic acid, naphthalenedicarboxylic acid and/or 4,4-bisphenyldicarboxylic acid, and one or several diols, such as ethylene glycol, propylene glycol, 1,4-butanediol, 1,4-cyclohexane dimethanol, neopentyl glycol and/or diethylene glycol.

These starting compounds can be processed into polyester material, preferably granules, in a manner known per se according to the continuous or discontinuous method of esterification or transesterification using known catalysts with subsequent melt polycondensation under vacuum.

Preferably, polyethylene terephthalate homopolymers and copolymers with a comonomer content of less than 10 Ma-% are used.

The granules can in this case be principally manufactured with any known method. For example, pelletizing, underwater granulation and various dropping methods are known from prior art. For the method according to the invention, those granulation methods which generate chips without sharp edges or corners, for example round or lenticular chips, are particularly appropriate. Therefore, underwater granulation and dropping are preferred.

If the granules, as for example in underwater granulation, are surrounded by liquid after their shaping, a device for separating the granules from this liquid has to be provided after the granulation. This can be, for example, a centrifugal dryer (centrifuge or similar) or else a screen, screen belt dryer, etc.

According to the invention, it is preferred for a polyester material from the polycondensation to be granulated with such an underwater granulation method before it is introduced into the crystallization according to the invention. Here, it is preferred for the temperature of the water used to be as high as possible to avoid unnecessary cooling of the polyester material. The polyester material from the polycondensation preferably has an intrinsic viscosity of at least 0.3, preferably 0.5, and in particular preferred of up to 0.8, in some embodiments even up to 1.0. Underwater granulation can be performed as stated in the prior art discussed above, i.e. after granulation, the water is removed by centrifugation, for example using a centrifuge.

The thus obtained still very warm polyester material can then be directly introduced into the crystallization stage of the present invention.

For performing the method according to the invention, the granulation method has to be designed such that partly crystalline polyester material is formed. Preferably, the partly crystalline polyester material has a degree of crystallization of about 1 to 10%.

The polyester granules obtained from the method according to the invention preferably achieve a degree of crystallization at appropriate temperatures and with appropriate residence times of about 35 to about 48%.

The temperatures preferred for performing the method depend, according to the invention, on the glass transition temperature $T_g$ and the crystallization temperature $T_k$ of the respective polyester. In the crystallizer, a temperature T should be adjusted to between ($T_g$+50 K) and ($T_k$+50 K). Preferably, a temperature T should be adjusted to between ($T_g$+70 K) and ($T_k$+30 K).

The preferred residence time in the crystallizer is 1 min to about 30 min, preferably about 3 to about 15 min.

The energy required for adjusting the temperature can be partially or completely the energy latently stored in the chips, or the energy difference is added or removed by means of a flow of gas.

If a flow of gas has to be used for adjusting the temperature, the same preferably consists of air and/or technically produced nitrogen.

In conformity with the present invention, in the crystallization according to the invention no increase in intrinsic viscosity is effected as an appropriate intrinsic viscosity is already generated in the polycondensation reactor. This is a difference to prior art where in a combined pre-crystallization/crystallization/SSP reaction, the viscosity is increased by about 0.2 dl/g, for example from 0.6 to 0.8 dl/g, with simultaneous dealdehydization to acetaldehyde contents of less than 1 ppm. In the prior art, a crystallization of the cold and amorphous chips from polycondensation is necessary for this, as these amorphous chips otherwise agglomerate in the SSP reaction at temperatures of more than 200° C. This requires many apparatuses and also the application of much energy as the chips have to be heated. Simultaneously, by this method procedure in the prior art, a material with a certain crystalline structure is obtained, based on the heat supply from outside. The chips obtained in conformity with the methods of prior art have a very strong and broad external layer with narrow and large nodular structures which become less towards the inside. This structure has to be destroyed when the polyester material is further processed, for example for the manufacture of moulded products, which also consumes a lot of energy. Moreover, the external area of the polyester material granules has a very high intrinsic viscosity, while towards the inside, the intrinsic viscosity decreases and amorphous materials can also still be present. This results in a mixed viscosity during melting, so that additional means are required to obtain a really homogenous material that can be easily processed. This is a problem in particular with respect to further processing. Simultaneously, a comparably high content of crystallization is obtained in prior art which in turn is negative for the melting process, for example in an extruder, as the melting temperature has to be increased as the degree of crystallization increases to obtain satisfactory moulded products. This increases the energy demand and simultaneously increases again the acetaldehyde content of the material mixture, so that the quality of the final product is deteriorated.

These disadvantages do no longer exist in the method according to the invention. The invention provides that the granulated materials entering the crystallization apparatus already have a temperature above the crystallization temperature which is achieved (as described in the present application) by the materials coming from polycondensation being very quickly granulated, preferably in an underwater granulator, whereupon excess water is removed by means of a centrifuge and the granulated chips are equally very quickly introduced into the crystallizer in conformity with the present invention. Due to the thereby still contained latent heat in the polyester material, the crystallization of the materials directly starts, which is different from prior art where first the cooled polyester material has to be heated. In the crystallizer according to the invention or in the crystallization step according to the invention, the defined method procedure then permits a quick adjustment to a uniform degree of crystallization, degrees of crystallization of up to 42% being preferably obtained. Due to the very short cooling of the polyester material in the underwater granulation, the chips introduced into the crystallizer have, in conformity with the present application, only a very thin surface layer or skin which is, compared to the outer layer in conventional method procedures, in addition clearly more uneven, so that even the contact areas between the chips are much smaller, so that the risk of agglomeration is clearly reduced. In the tests according to the invention, an agglomeration of the polyester materials could be completely avoided in the crystallization step as well as in a subsequent dealdehydization.

By the possible gas introduction during crystallization, in addition the contained acetaldehyde can be discharged from the process already during crystallization. To this end, for example a purification step for the process gas can be necessary before the purified process gas is again returned to the method.

It is furthermore possible according to the invention to keep the temperature in the crystallization step of the present invention at up to 185° C. due to the sensible heat of the still hot chips from the granulation in combination and the crystallization heat, such that here a very energy-efficient crystallization method is provided which can largely do without the external supply of energy.

In preferred embodiments, the material is passed into a dealdehydization tower after crystallization in which as usual the intrinsic viscosity of the polyester material remains unchanged, while the degree of crystallization still slightly increases, for example to values of maximally up to 50%, with a simultaneous reduction of the acetaldehyde content to clearly less than 1 ppm.

The chips obtained in conformity with the method according to the invention after crystallization have a crystalline structure from the inside to the outside, as in conformity with the present invention the crystallization inside the chips starts due to the still contained latent heat. According to the invention, spherulites of uniform size are generated up to the edge area of the chips, i.e. the spherulites can be seen in the complete area of the chips. Only in the external area of the chips, very small and fine structures are formed, which, however, are not comparable to the strong external layer obtained in the conventional method. This chip structure does not pose any problems in a subsequent melting for further processing. Furthermore, the intrinsic viscosity distribution is the same across the whole chip and also across the sum of all chips.

The type of crystallization obtained according to the invention as well as the lower degree of crystallization are very advantageous with respect to the further processing of the polyester material. The processor needs, with the same intrinsic viscosity, i.e. the same mechanical properties of the final products, a melting temperature lower by up to 20° C., with a shorter residence time for melting and a shorter residence time for distributing the melt in the tool. At the same time, this gentler treatment essentially reduces or completely suppresses the new formation of acetaldehyde, so that higher-quality products are also obtained. Polyester chips obtained according to the invention usually have an HOF value (kJ/kg) of about 42, while conventional polyester chips have a value of about 57 (HOF: heat of fusion).

This again illustrates the essential advantages of the present invention.

In a particularly preferred embodiment, crystallization is performed in three subsequent zones I, II and III of a shaft-type crystallizer, in which steps (i), (ii) and (iii) are performed. In zone I, the granules are treated under mechanical disturbances and, if required, with gas in countercurrent flow, in zone II under mechanical disturbances and, if required, with gas in co-current flow, and in zone III without mechanical disturbance and, if required, with gas in co-current flow.

The mechanical disturbances preferably occur periodically in a volume element of the granules, for example by movement of the arms of a rotating stirrer.

Steps (i) to (iii) of the method according to the invention are particularly preferably performed continuously, i.e. the polyester material flows through zones (I) to (III) in a continuous flow.

The temperature appropriate for crystallization in zones (I) to (III) is preferably approximately between ($T_g$ +50 K) and ($T_K$ +50 K), in particular between ($T_g$ +70 K) and ($T_k$ +30 K).

The residence time of the polyester material in the crystallization reactor is preferably about 1 to about 30 min., preferably about 3 to about 20 min, and in particular about 3 to about 15 min.

Crystallization is preferably performed in a device according to the invention for the manufacture of polyesters. The device according to the invention contains a granulator, optionally a device for separating the granules from a liquid, and a crystallizer (70) with three subsequent sections (80, 90, 100), at least one inlet opening (110) provided in the first section (80), at least one outlet opening (12) provided in the third section (100), an apparatus for causing mechanical disturbance of the polyester material (130) provided in the first and second sections (80, 90), if required at least one gas inlet opening (140) arranged in the transitional area of the first and second sections, and resulting from the flow of gas at least one gas outlet opening (150, 160) provided in zone (I) and/or in zone (III).

Preferably, zones (I) and (II) have a cylindrical shape and zone (III) has a shape tapered towards the bottom, in particular a conical shape.

Figure 1:
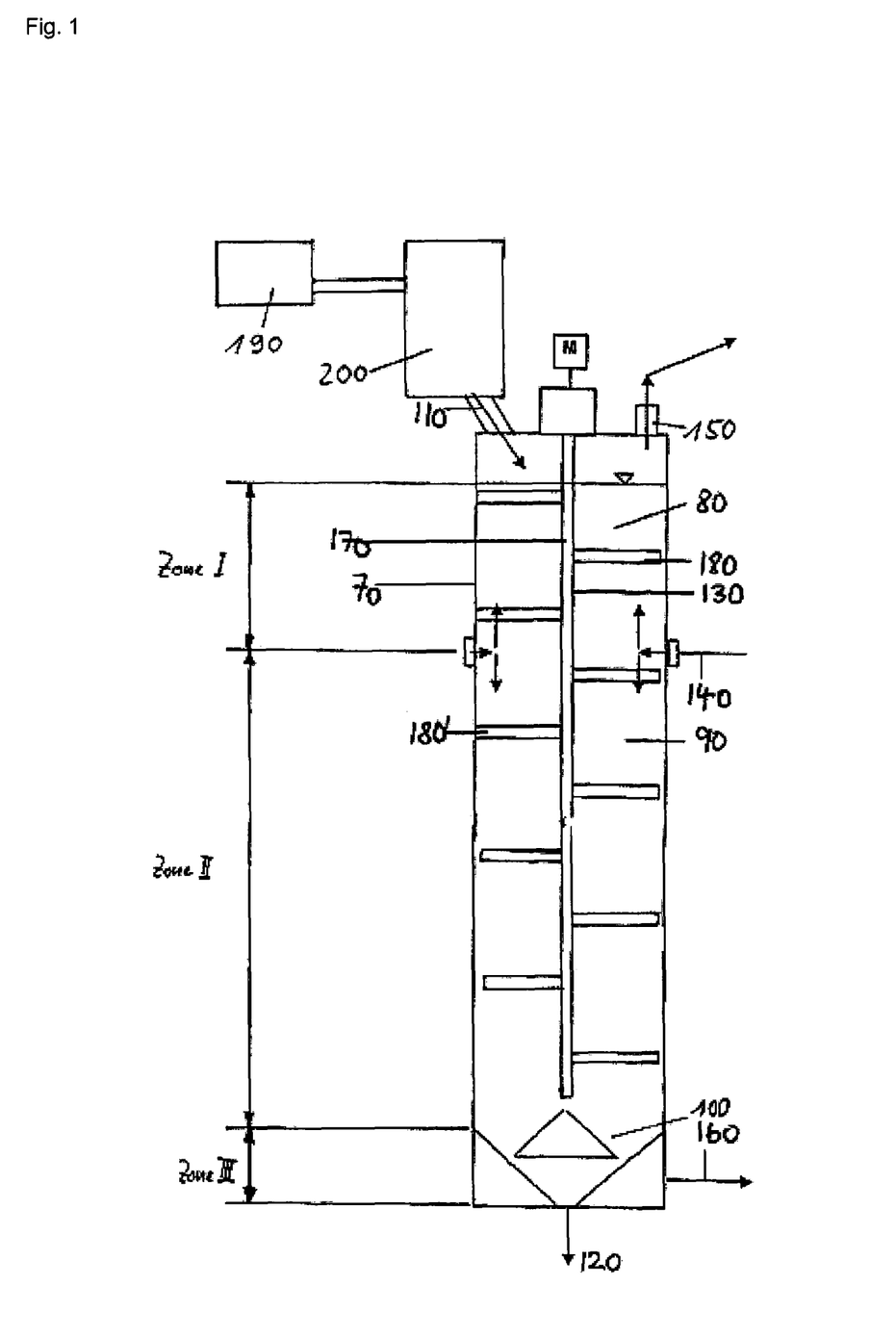
FIG. 1 is a schematic representation of a device used to produce crystallized polyesters.

In a preferred embodiment, as shown in FIG. 1, the device according to the invention contains an apparatus for generating a periodical mechanical disturbance 130 with a shaft 170 at which at least two, preferably two to eight arms 180, 180' are provided.

FIG. 1 shows a preferred embodiment of a device according to the invention with a granulator 190, optionally a device 200 for separating the granules from a liquid and a so-called shaft-type crystallizer 70 in which the method according to the invention can be performed. The granules are, as is shown in FIG. 1, introduced into the continuously operating vertical three-part shaft-type crystallizer 70 with a rotating centred shaft 170 installed in the longitudinal axis. In the first and second sections 80, 90 of the shaft-type crystallizer, zones (I) and (II), arms 180, 180' are attached at predetermined distances at the shaft with low flow resistance, by which arms a periodical mechanical disturbance of the bulk material is achieved. Due to this mechanical disturbance and the movement of the granules from the top to the bottom, agglomerate formation (agglomeration) of the material is prevented. In the third section 100 of the shaft-type crystallizer, the granules are treated without disturbances in zone (III).

In zones (I) and (II), the granules are periodically mechanically disturbed, while in the undisturbed zone (III), the residence time is evened out.

The flow of gas is controlled such that the gas is supplied between zone (I) and zone (II) (first and second sections of the shaft-type crystallizer) via a gas inlet opening 140 and leaves the crystallizer again partly in the upper or first section 80 via a gas outlet opening 150 and partly in the lower or third section 100 via a gas outlet opening 160. In the process, the gas in zone (I) (first section of the shaft-type crystallizer) is conducted in countercurrent flow to the granules, and in zones (II) and (III) (second and third sections of the shaft-type crystallizer) in co-current flow.

The gas outlet openings 150, 160 are in this case preferably arranged such that the gas introduced through the gas inlet opening 140 is conducted as long as possible with the granules in countercurrent or co-current flow, i.e. at the beginning of the first section 80 and at the end of the third section 100 of the shaft-type crystallizer 70.

The granulator 190 can, for example, be a pelletizer, an underwater granulator or a dropping apparatus.

The optionally existing device 200 for separating the granules from the liquid can be, for example, a centrifugal dryer (a centrifuge or similar) or else a screen, a screen belt dryer, etc.

In zone (I), the PET granules are held at the required treatment temperature under periodically acting mechanical disturbance and, if required, by means of correspondingly temperature-controlled gas in countercurrent flow to the granules with a gas-chip ratio of 0.1-3 and a residence time of 1-10 min.

In zone (II), the PET granules are further crystallized and evened out under periodically acting mechanical disturbance, if required, in co-current flow with the gas at a gas-chip ratio of 0.1-1. The residence time is 1-10 min.

The PET granules treated in this manner in zones (I) and (II) are preferably treated in the undisturbed zone (III) (section 100 of the shaft-type crystallizer 70) at a temperature between ($T_g$+50 K) and ($T_K$+50 K), in particular between ($T_g$+70 K) and ($T_K$+30 K) in co-current flow with a gas-chip ratio of 0.1-1 in such a manner that crystallization is terminated with a medium residence time of 1-10 min.

The total residence time of the polyester material in the above-described zones (I) to (III) of the crystallization is preferably between 2-20 min, in particular 3-15 min, where the ratio of the residence time in zone (I) to the residence time in zone (II) is 1:0.5 to 1:4.

The polyester material employed in the method according to the invention preferably has an I.V. of about 0.3 dl/g to about 0.9 dl/g, preferably about 0.3 dl/g to 0.85 dl/g, particularly preferred about 0.66 dl/g to 0.85 dl/g, in particular about 0.72 to 0.84 dl/g.

The method according to the invention essentially reduces the agglomeration tendency of the granules.

The material obtained in the process can subsequently be directly supplied to SSP to further increase viscosity. It has been surprisingly found that the method according to the invention can also be executed with granules that already have a high I.V. Therefore, appropriate granules from the method according to the invention can also be directly supplied to a dealdehydization stage. In both cases, granules are subsequently obtained which can be further processed into moulded polyester products where a low acetaldehyde content is necessary, such as for example bottles. Other applications are, for example, the processing into technical yarns, foils, films, sheets and other moulded products.

According to the invention, however, a method procedure without additional SSP reaction is preferred, as the advantages according to the invention in particular occur if the desired intrinsic viscosity was already obtained in the polycondensation stage. Thus, by the advantages of the method procedure according to the invention, an SSP reaction can be dispensed with, which reduces the amount of apparatuses required as well as energy costs.

If polyester material with an I.V. of about 0.3 dl/g to about 0.72 dl/g is employed in the crystallization, SSP is preferably conducted afterwards.

As partly crystalline polyester can tend to increased agglomeration during crystallization in the crystallizer and in the following solid state polycondensation reactor by high exothermic heat development and as these agglomerations can be so strong that they do not unstick when common crystallization and solid state polycondensation methods are employed, it is preferred to employ spherical polyester material in the method according to the invention. However, other granular shapes can also be used, such as cylindrical or flake-shaped granules.

Cylindrical and flake-shaped granules, however, are not preferred as they more easily agglomerate due to the surfaces and edges and as their abrasion is higher. Due to the asymmetry of these granules, uniform crystallization from the shell to the core of the chip is difficult. Compared to cylindrical or flake-shaped chips having the same weights, the employment of nearly spherical chips has the advantages of a more uniform crystallization, an improved molecular-weight distribution in the chip and a powder density higher by 5-10%. A further essential advantage is the lower dust content when spherical chips are used.

High dust contents are problematic in the further processing of polyester chips, as for example in SSP, the dust undergoes an essentially higher increase in I.V., which has detrimental effects in the later processing as gel particles or infusable particles.

It is particularly preferred for the employed granules to have a surface of 1.45-2.0 m²/kg, preferably 1.50 to 1.90 m²/kg.

The granules obtained with the method according to the invention preferably have a uniform degree of crystallization of about 35 to about 48%, in particular about 41%, and are in this crystallization technology pre-treated such that agglomerations of the PET granules as a result of exothermic reactions are avoided in a possibly subsequent SSP or dealdehydization.

The dust content of the granules is preferably <10 ppm after the crystallization according to the invention.

The granules obtained according to the invention preferably have an I.V. variation of less than 1.5%.

The heat of fusion (HOF) of the granules obtained according to the invention is preferably less than 50 kJ/kg. A low HOF permits a better and gentler further processing as the energy required for melting, for example in an extruder, is lower and the temperature of the heating devices can remain lower.

The present invention moreover relates to a method for the manufacture of moulded polyester products, wherein polyester material, in particular granules, obtained according to the method of the invention is used without solid state polycondensation.

In particular, polyester material, particularly in the form of granules or chips, that was manufactured with the method according to the invention and has an I.V. of >0.66 dl/g can be passed from the melt polycondensation directly without solid state polycondensation to processing with stretch-blow or injection stretch-blow moulding methods for manufacturing the moulded polyester products. On the other hand, the polyester material with lower I.V. can, after melt polycondensation and after the crystallization method according to the invention, subsequently be subjected to common solid state polycondensation that operates either continuously or discontinuously and then be used for manufacturing moulded polyester products.

The moulded polyester products are preferably selected from the group consisting of bottles, foils, films, sheets and technical high-performance fibres.

The invention will now be described more in detail with reference to some embodiments that are by no means restrictive. The given property values were here determined as follows:

The glass transition temperature $T_g$ and the crystallization temperature $T_k$ of the polymer to be crystallized are determined by means of Differential Scanning Calorimetry (DSC). The principles of these methods are described in generally known technical books, for example in Lechner, Gehrke, Nordmeier, Makromolekulare Chemie, $2^{nd}$ edition 1996, pages 354 to 372. The measurement itself is made in a DSC apparatus. The polymer sample is heated therein in a first heating run for one minute to 40-50 K above its melting temperature (for example PET to 310° C., PTT to 270° C., and PBT to 280° C.), the sample is subsequently immediately taken out of the DSC apparatus and cooled by contacting it with a cold copper plate. Thereby, the sample is first brought into a reproducible amorphous state. In a subsequent second heating run, this sample is heated at a constant heating rate of 10 K/min from room temperature to the above-mentioned temperature of 40-50 K above its melting temperature. The evaluation is normally performed by means of software provided in the DSC apparatus, wherein $T_g$ is determined from the inflection point of the thermogram and $T_k$ from the maximum of the crystallization heat peak.

This measurement also permits the determination of the degree of crystallization in a usual manner.

The intrinsic viscosity (I.V.) was measured at 25° C. with a solution of 500 mg of polyester in 100 ml of a mixture of phenol and 1,2-dichlorobenzene (3:2 parts by weight).

The determination of diethylene glycol (DEG), isophthalic acid (IPA) and 1,4-cyclohexane dimethanol (CHDM) in the polyester is made by means of gas chromatography after previous methanolysis of 1 g of polyester in 30 ml of methanol with adding of 50 mg/l zinc acetate in a bomb tube at 200° C.

The measurement of the chromatic values L and b was made according to HUNTER. The polyester chips were first crystallized in the oven at 135±5° C. for one hour. The chromatic values were afterwards determined by measuring the hue of the polyester sample in a three-range calorimeter with three photocells, which were preceded by a red, green and blue filter each (X, Y and Z values): The evaluation was made according to the formula by HUNTER, wherein $$L = 10\sqrt{Y} \text{ and}$$
$$b = \frac{7.0}{\sqrt{Y}\,(Y - 0.8467Z)}$$

The acetaldehyde was stripped from the polyester by heating in a closed vessel and the acetaldehyde in the gas space of the vessel was determined by gas chromatography with the Head space injection system H540, Perkin Elmer, carrier gas: nitrogen; column: 1.5 m high-grade steel; filling: Poropack Q, 80-100 mesh; sample quantity: 2 g; heating temperature: 150° C.; heating duration: 90 min.

The determination of the height of fusion (HOF) was performed in a DSC apparatus of the Co. Mettler corresponding to ASTM E 793 of the American Society for Testing of Materials with a heating rate of 50 K/min from 100 to 200° C., holding this temperature for 5 min, and subsequently with a heating rate of 10 K/min up to 300° C.; the consumed energy is to be determined in kJ/kg.

The dust analysis is performed gravimetrically. To this end, 1 kg of chips are washed with methanol, the cleansing agent is filtered off via a filter and the residue is dried and weighed.

The polyethylene terephthalate polymer (PET) for the examples was produced according to the known prior art and had the following composition: catalyst content Sb: 200 ppm, phosphorous content: 17 ppm, cobalt: 15 ppm, blue dye: 0.5 ppm, IPA: 2 M %, DEG: 1.3 M %.

EXAMPLE 1

Comparison Standard Crystallization with Subsequent SSP

In example 1, nearly amorphous cylindrical PET chips having a weight of 15.5 mg/chip and a surface of 1.85 $m^2$/kg, a powder density of 790 kg/$m^3$ and an I.V. of 0.612 dl/g were crystallized according to the method of the DE 10158793 A1 and solid state polycondensed from the melt polycondensation method for manufacturing slightly modified PET for bottles to be filled with soft drinks containing carbon dioxide (CSD), water or other media to be filled in. In the first crystallizer stage, a fluid bed crystallizer, pre-crystallization was performed for 60 min at 200° C. In the second crystallizer stage, an agitator crystallizer, crystallization was performed for 75 min at 219° C. The chips exiting from the fluid bed crystallizer only had a low dust content despite strong dust formation as the major part of the dust was discharged by the turbulent air and collected in the waste gas purification filter.

The results of Example 1 are represented in Table 1.

EXAMPLE 2

Nearly round PET chips having a weight of 15.5 mg, a surface of 1.55 $m^2$/kg and a powder density of 840 kg/$m^3$ were produced according to the method described in DE 10349016 A1 with an underwater granulator and separated from the water. However, no vibration or oscillation unit was used. These chips had a $T_g$ of 78.6° C. and a $T_k$ of 149.3° C. Subsequently, these chips were crystallized according to the method of the invention. The temperature was 172° C., the residence time in the crystallizer (zones (I) to (III)) altogether 6 min. No flow of gas was introduced.

The results of Example 2 are represented in Table 2.

EXAMPLE 3

The operations of Example 2 were repeated. The temperature, however, was 176° C. and the residence time in the crystallizer was 12 min. No flow of gas was introduced.

The results of Example 3 are represented in Table 3.

TABLE 1

Example 1 (Standard crystallization with subsequent SSP)

| Analyses | Employed material | $1^{st}$ Crystallizer, fluid bed crystallizer | $2^{nd}$ Crystallizer, agitator crystallizer |
|---|---|---|---|
| I.V. [dl/g] | 0.612 | 0.617 | 0.621 |
| Colour L | 82.7 | 84.9 | 87.7 |
| Colour a | −1.6 | −1.4 | −1.4 |
| Colour b | −3.6 | −0.8 | −0.7 |
| AA [ppm] | 45 | 9.1 | 3.5 |
| KTG [%] | — | 48.5 | 51 |
| Dust [ppm] | — | <10 | >500 |
| HOF [kJ/kg] | — | — | 53 |

TABLE 2

Example 2

| Analyses | Employed material | after shaft-type crystallizer |
|---|---|---|
| I.V. [dl/g] | 0.765 | 0.753 |
| Colour L | 88 | 88.5 |
| Colour a | −1.8 | −1.8 |
| Colour b | 2.0 | 2.2 |
| AA [ppm] | 36 | 25 |
| KTG [%] | 3 | 40.8 |
| Dust [ppm] | <10 | <10 |
| HOF [kJ/kg] | — | 40.0 |

TABLE 3

Example 3

| Analyses | Employed material | $1^{st}$ Crystallizer, fluid bed crystallizer |
|---|---|---|
| I.V. [dl/g] | 0.779 | 0.764 |
| Colour L | 88 | 88 |
| Colour a | −1.8 | −1.8 |
| Colour b | 2.0 | 2.0 |
| AA [ppm] | 36 | 18 |
| KTG [%] | 3 | 42.5 |
| HOF [kJ/kg] | — | 40.8 |
| Dust [ppm] | <10 | <10 |

The material of Examples 2 and 3 were dried in a challenger dryer at 170° C. for 4 hours and subsequently processed into preforms and bottles with a single-stage machine (injection stretch blow moulding machine) of Type 250 EX HAT of the manufacturer ASB with a 6-cavity tool and an output of 800-1000 bottles/hour.

The manufacture of preforms and bottles did not represent any problems. The transparency of the bottles was good and colourless.

What is claimed is:

1. A method for the manufacture of crystallized polyester material, comprising providing a partly crystalline polyester material comprising a degree of crystallization of 1% to 15% and a granule temperature above the crystallization temperature $T_k$ and permitting the partly crystalline polyester material to flow through a crystallization apparatus at a treatment temperature suited for crystallization, wherein the crystallization apparatus has three zones (I), (II), and (III), wherein the partly crystalline polyester material is crystallized
   (i) in zone (I) under mechanical disturbance and without flow of a gas,
   (ii) in zone (II) under mechanical disturbance and without flow of a gas, and
   (iii) in zone (III) without mechanical disturbance and without flow of a gas
   and wherein the total residence time of the polyester material in zones (I), (II) and (III) is from 2 to 20 minutes.

2. The method of claim 1, wherein the treatment temperature is between $(T_g+50\ K)$ and $(T_K+50\ K)$.

3. The method of claim 2, wherein the treatment temperature is between $(T_g+70\ K)$ and $(T_K+30\ K)$.

4. The method of claim 1, wherein the partly crystalline polyester material comprises a polyethylene terephthalate and the treatment temperature is $\leq 195°$ C.

5. The method of claim 1, wherein the partly crystalline polyester material comprises a polytrimethylene terephthalate and the treatment temperature is $\leq 120°$ C.

6. The method of claim 1, wherein the partly crystalline polyester material comprises a polybutylene terephtalate and the treatment temperature is $\leq 200°$ C.

7. The method of claim 1, wherein the polyester material comprises granules.

8. The method of claim 7, wherein the granules comprise spherical granules.

9. The method of claim 1, wherein the total residence time of the polyester material in zones (I) and (II) is $\leq 12$ minutes.

10. The method of claim 1, wherein the total residence time ratio of the polyester material in zone (I) to zone (II) is about 1:0.5 to 1:4.

11. The method of claim 1, wherein the polyester material employed in the crystallization has an I.V. of at least 0.3 dl/g.

12. A method for manufacturing a moulded product comprising manufacturing crystallized polyester material according to claim 1 and producing the moulded product from the crystallized polyester material without solid state polycondensation.

13. The method of claim 12, wherein the moulded polyester products are selected from the group consisting of bottles, foils, films, and technical high-performance fibres.

* * * * *